United States Patent [19]

McGhee

[11] Patent Number: 4,545,399

[45] Date of Patent: Oct. 8, 1985

[54] VALVE

[76] Inventor: Charles M. McGhee, 2319 Cardigan, Memphis, Tenn. 38119

[21] Appl. No.: 550,955

[22] Filed: Nov. 14, 1983

[51] Int. Cl.⁴ .............................................. F16K 43/00
[52] U.S. Cl. ................................ 137/315; 137/329.04; 137/454.5
[58] Field of Search .................. 137/315, 454.2, 454.5, 137/454.6, 329.01, 329.02, 329.03, 329.04; 251/357, 309, 360, 304

[56] References Cited

U.S. PATENT DOCUMENTS

| | | | |
|---|---|---|---|
| 3,780,758 | 12/1973 | DeVries | 137/454.6 |
| 3,788,601 | 1/1974 | Schmitt | 137/454.6 |
| 3,789,862 | 2/1974 | Keller | 137/454.5 |
| 3,831,621 | 8/1974 | Anthony | 137/454.6 |
| 3,913,612 | 10/1975 | Tolnai | 137/454.6 |
| 3,967,811 | 7/1976 | Keller | 251/175 |
| 4,033,373 | 7/1977 | Manoogiun et al. | 137/454.6 |
| 4,175,586 | 11/1979 | Hayman | 137/454.6 |
| 4,331,176 | 5/1982 | Parkison | 137/454.6 |
| 4,376,448 | 3/1983 | Skough | 137/329.02 |

Primary Examiner—G. L. Walton
Attorney, Agent, or Firm—Walker & McKenzie

[57] ABSTRACT

An improved valve for water faucets or the like. The valve has a stem with a locking surface at the lower end thereof, and a seal that has a coacting locking surface matingly engaging the stem locking surface. The locking surfaces are so formed that separation of the seal from the stem is prevented when assembled in the valve but the seal comes apart when removed from the valve. The seal means has a pair of blocking surfaces and a pair of undercut portions with only one of each pair being in operative relationship to a single water exit so that when the operative blocking surface becomes worn, the stem-seal assembly may be turned 180° for restoring the valve to its normal operating condition.

14 Claims, 26 Drawing Figures

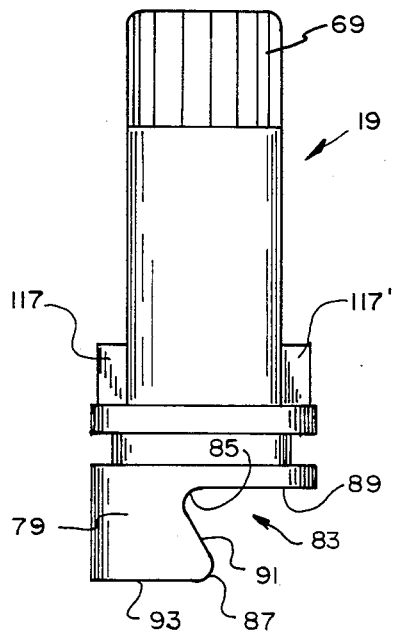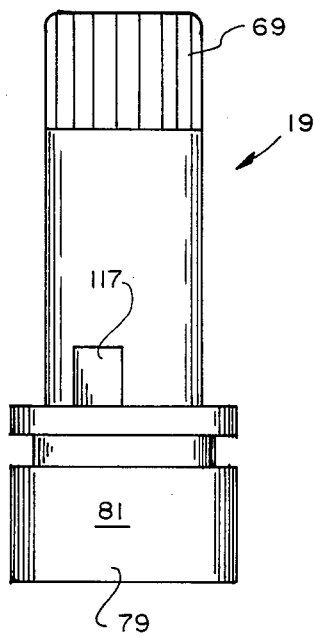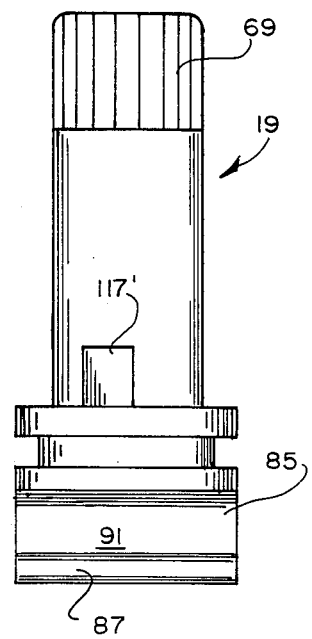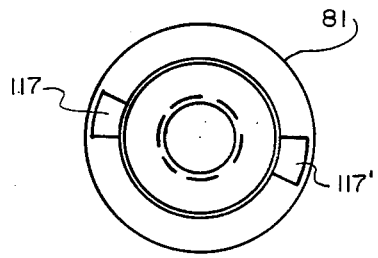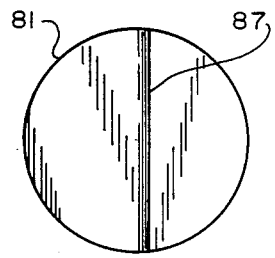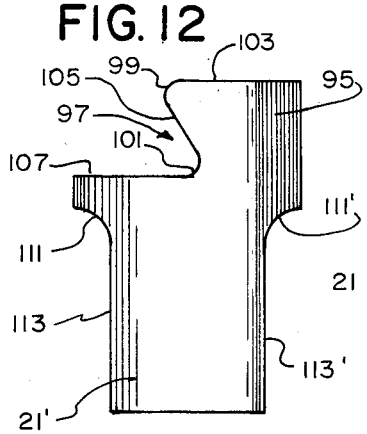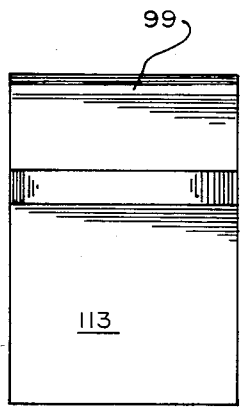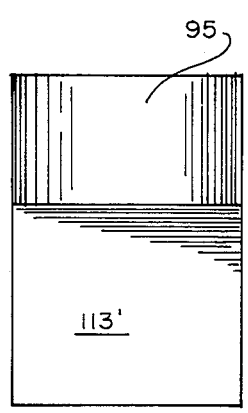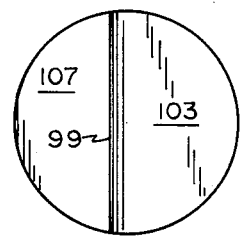

FIG. 18
FIG. 19
FIG. 20
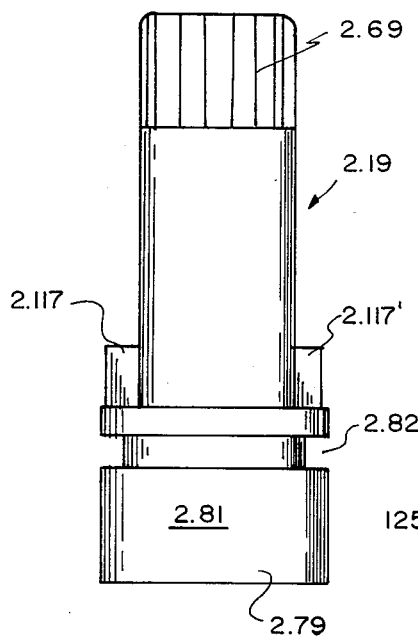
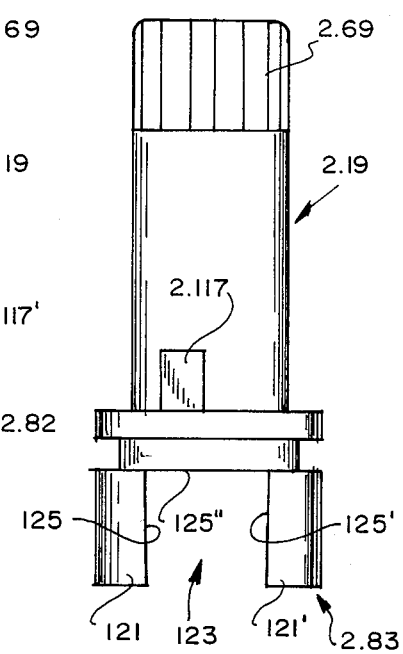
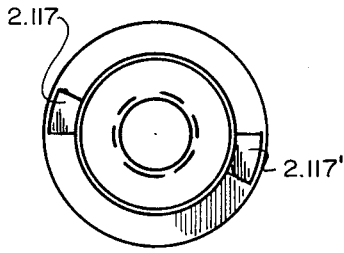
FIG. 21
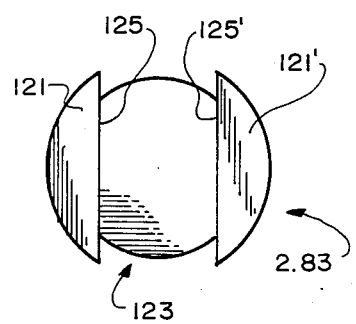
FIG. 22
FIG. 23
FIG. 26
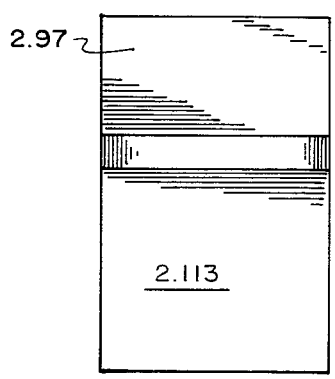
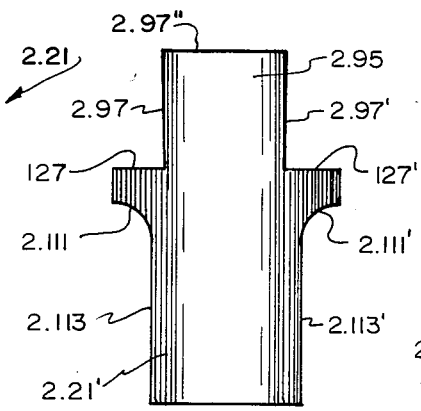
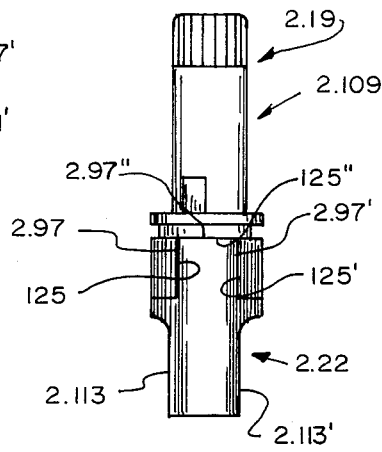
FIG. 24
FIG. 25
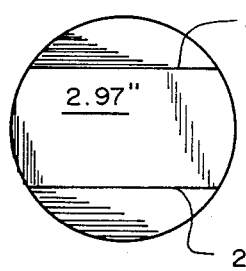
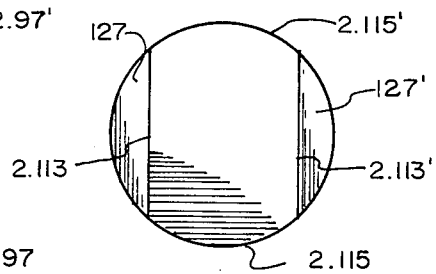

VALVE

BACKGROUND OF THE INVENTION

1. Field of the Invention

The present invention relates to a valve for a water faucet or the like.

2. Description of the Prior Art

Heretofore various valve constructions have heretofore been patented. U.S. Pat. No. 3,967,811 granted to Keller discloses a valve construction having a pair of seal members urged into position by means of a spring. Other valve constructions are disclosed in U.S. Pat. No. 3,570,810 granted to Kawolics; U.S. Pat. No. 3,783,900 granted to Waldbillig; U.S. Pat. No. 4,147,184 granted to Jess; U.S. Pat. No. 4,217,925 granted to Clark; and U.S. Pat. No. 4,277,046 granted to Cavileer. None of the above mentioned patents disclose applicant's invention.

SUMMARY OF THE INVENTION

The present invention is directed towards improving upon prior valves for water faucets or the like. The concept of the present invention is to provide an improved valve having a unique seal therein which when worn may be easily restored or replaced.

The improvement of the present invention comprises in general a stem having a locking surface at the lower end thereof, a seal matingly engaging the stem locking surface for coupling the seal to the stem, the stem/seal combination being turnably mounted in the faucet chamber for movement between a closed position in which the seal blocks the exit opening of the faucet and open positions in which the exit opening is uncovered by the seal.

Thus, one of the objects of the present invention is to provide an improved valve having a unique seal therein which when worn may be easily restored or replaced.

A further object is to provide such a seal which has a pair of blocking means disposed on opposite sides of the seal 180° from one another with one of the pair of blocking means being adapted to block the exit of water from the valve and which seal has a pair of undercut faces disposed on opposite sides of the seal 180° from one another and symmetrically disposed between the blocking means, with one of the pairs of undercut faces being adapted to permit the exit of water from the valve. The seal is removable from the stem and replaceable in a position 180° from its original position whereby when one of the blocking means is worn, the other blocking means may be brought into operative position for the restoring of the faucet to normal nonleaking operation.

A further object is to provide such a seal/stem combination which may be easily and quickly restored or replaced.

BRIEF DESCRIPTION OF THE DRAWINGS

FIG. 7 is a front elevational view of the stem of the present invention.

FIG. 8 is a side elevational view thereof from the left side of FIG. 7.

FIG. 9 is a side elevational view thereof from the right side of FIG. 7.

FIG. 10 is a top plan view of that shown in FIG. 7.

FIG. 11 is a bottom view thereof.

FIG. 12 is a front elevational view of the seal of the present invention.

FIG. 13 is a side elevational view of the seal of the present invention as viewed from the left side of FIG. 12.

FIG. 14 is a side elevational view thereof as viewed from the right side of FIG. 12.

FIG. 15 is a top plan view of the stem shown in FIG. 12.

FIG. 18 is a front elevational view of a second embodiment of the stem of the present invention.

FIG. 19 is a side elevational view thereof from the left side of FIG. 18.

FIG. 20 is a top plan view of that shown in FIG. 18.

FIG. 21 is a bottom view thereof.

FIG. 22 is a front elevational view of a second embodiment of the seal of the present invention adapted to be used with the stem shown in FIG. 18.

FIG. 23 is a side elevational view of that shown in FIG. 22.

FIG. 24 is a top plan view thereof.

FIG. 25 is a bottom view thereof.

FIG. 26 is a side elevational view of the assembly of the stem of FIG. 19 and the seal of FIG. 23, on a reduced scale.

DESCRIPTION OF THE PREFERRED EMBODIMENT

Figure 1:
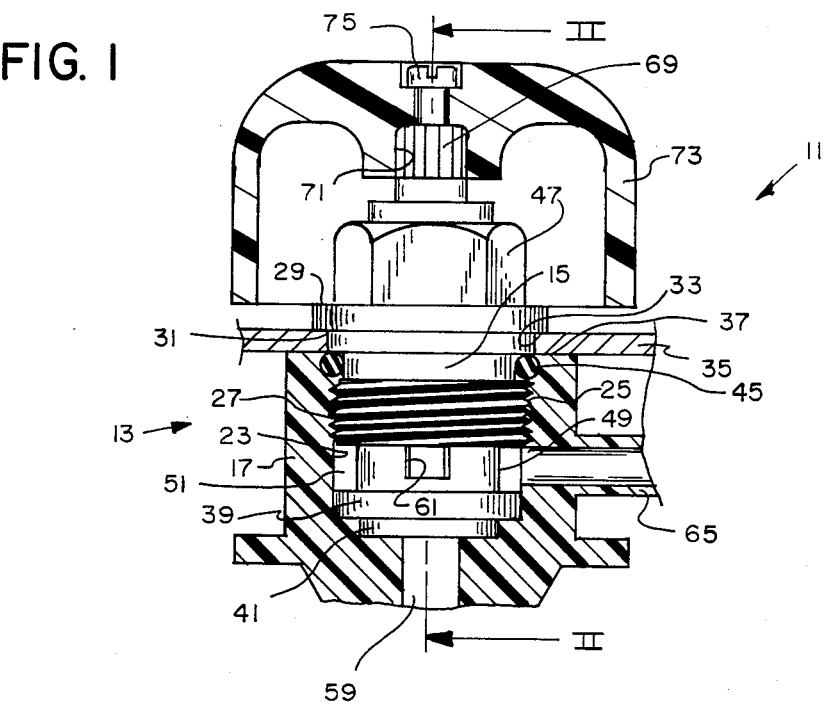
FIG. 1 is a transverse vertical sectional view showing the assembly of the valve of the present invention with related parts of the faucet.

The valve 11 of the present invention comprises in general a body 13 including an upper body 15 and a lower body 17, a valve stem 19 and a seal 21. Substantially, all of valve 11 is preferably, though not necessarily, formed of plastic or the like.

Lower body 17 is provided with a generally cylindrical bore 23 centrally thereof and opening upwardly. Internal threads 25 are provided in bore 23 which are adapted to be threadedly engaged by the external threads 27 on valve stem 19. Upper body 15 includes a flange 29 and a stepped portion 31 therebelow.

Upper body 15 extends through an aperture 33 in a fixed portion 35 of the faucet (not shown). The external threads 27 on upper body 15 are threadedly engaged with internal threads 25, as best shown in FIG. 1, with stepped portion 31 extending down into the aperture 33 and with the portions of fixed portion 35 surrounding aperture 33 being clampingly engaged between flange 29 and the upper edge 37 of lower body 17 to hold the body 13 in place.

Adjacent the lower end of lower body 17 is provided a depending flange 39 which engages a ledge 41 to limit downward movement of lower body 17. A groove 43 is provided in flange 39 into which preferably is seated an O-ring, not shown, to provide sealing means between the lower end of lower body 17 and upper body 15. In addition, an O-ring 45 is provided to seal upper body 15 and the upper end of lower body 17.

Upper body 15 is preferably integrally formed of plastic and is provided with a hexagon shaped portion 47 adjacent the upper end thereof for being engaged by a wrench or the like to install upper body 15 threadedly into lower body 17. Upper body 15 is provided with a reduced portion 49 below threads 27 and above flange 39 so that when upper body 15 is in place in lower body 17 there is established an annular chamber 51. Upper body 15 has provided centrally thereof a cylindrical bore 53 which extends from the top wall 55 of upper body through the lower end 57 of body 15 so that the lower end is open. An inlet conduit 59 is provided centrally of lower body 17 for the water or the like. Conduit 59 opens into the open end 57 of upper body 15.

Exit means is provided for the water or the like from cylindrical bore 53 to the spigot, not shown, and which includes an exit opening or port 61 through the wall 63 of upper body 15, annular chamber 51 and an exit conduit 65 which connects annular chamber 51 to the spigot, not shown.

A central opening 67 is provided in top wall 55 of upper body 15 which turnably receives valve stem 19. The upper end of valve stem 19 has a toothed spline portion 69 which receives a correspondingly splined opening 71 provided centrally of handle 73, which is held in place by a screw 75 threaded into a threaded socket 77 in the upper end of valve stem 19.

The lower end 79 of stem 19 is generally cylindrical on the outer surface 81 thereof to turnably fit cylindrical bore 53 of upper body 15. Lower end 79 is preferably provided with a groove 82 into which is adapted to fit a seal such as an O-ring, not shown. The lower locking surface 83 of the lower end 79 is S shaped as viewed from the front (see FIG. 7). Thus, the locking surface 83 defines an undercut stem portion 85 above a protruding stem portion 87. Stated another way, the shape of the lower locking surface 83 of lower end 79, as viewed from the front in FIG. 7 extends from the right side of the stem 19 horizontally across the stem to the left as at 89 and then curves downwardly and outwardly to the right to the outwardly and downwardly sloping midportion of the S as at 91 and then curves to the left horizontally as at 93 to the left side of stem 19 to complete the S shape. Also, it will be understood that the surface 83 extends straight through the stem from the front to the back. In other words, if a milling machine were used to cut the locking surface 83, it would make a straight path from front to back of the stem 19.

Figure 2:
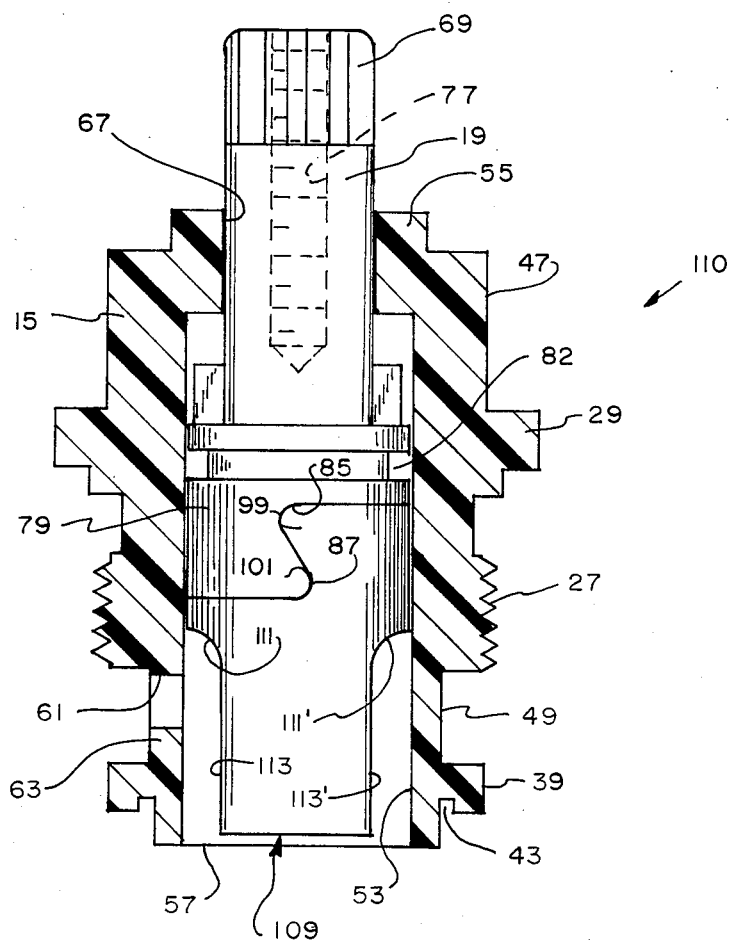
FIG. 2 is an enlarged sectional view taken as on line II—II of FIG. 1 with the seal/stem combination being shown in an open position.

Seal 21 is preferably integrally formed of a rubberlike material such as neoprene or the like. The upper end or coacting locking head 95 of seal 21 is complementarily shaped as compared with the lower end 79 of stem 19 so that the coacting locking surface 97 of seal 21 matingly engages the lower locking surface 83 of stem 19, as best seen in FIG. 2. Thus, coacting locking surface 97 is S shaped, as viewed from the front (see FIG. 12) to provide a protruding seal portion 99 and a coacting undercut seal portion 101. As viewed from the front, as in FIG. 12, coacting locking surface 97 extends from the right side of seal 21 to the left horizontally as at 103 and then downwardly and inwardly to the right along the sloping mid-portion 105, and then back to the left horizontally as at 107 to the left side of seal 21.

The upper end 95 of seal 21 is cylindrical and fits turnably in bore 53. When the stem-seal combination 109 is assembled as a unit as shown in FIG. 2, protruding seal portion 99 will fit into undercut stem portion 85 and protruding stem portion 87 will fit into undercut seal portion 101 to prevent longitudinal or vertical movement of seal 21 relative to stem 19 and yet permit seal-stem assembly 109 to turn together in cylindrical bore 53 when handle 73 is turned. The assembly of seal-stem combination 109 into lower body 17 for convenience will be designated herein as cartridge 110.

It will be understood that the surface of wall 63 that defines bore 53 will limit lateral movement of seal 21 and stem 19 relative to each other so that seal 21 and valve stem 19 are normally blocked from disengagement by wall 63. However, it will be understood that when seal-stem assembly 109 is removed from upper body 15, seal 21 will come apart from stem 19 so that seal 21 can be replaced by a new seal 21, if desired. However, as will be apparent in the description to follow, if seal 21 is worn on one side, seal-stem assembly 109 can be rotated 180° and replaced in upper body 15 for the restoration of the faucet to a normal non-leaking operation.

The lower part or seal body 21' of seal 21 is undercut on opposite sides thereof as at 111, 111' so that the lower part of seal 21 is narrower than the upper part as viewed from the front as in FIG. 12. Thus, when seal-stem assembly 109 is in assembled relationship relative to upper body 15, the opposite flat faces 113, 113' established by the undercut portions are spaced inwardly of the wall 63 of the upper body 15 as best seen in FIG. 2. Undercut faces 113, 113' are disposed on opposite sides of the seal 21, 180° from one another, that is they are facing in diametrically opposite directions.

Figure 16:
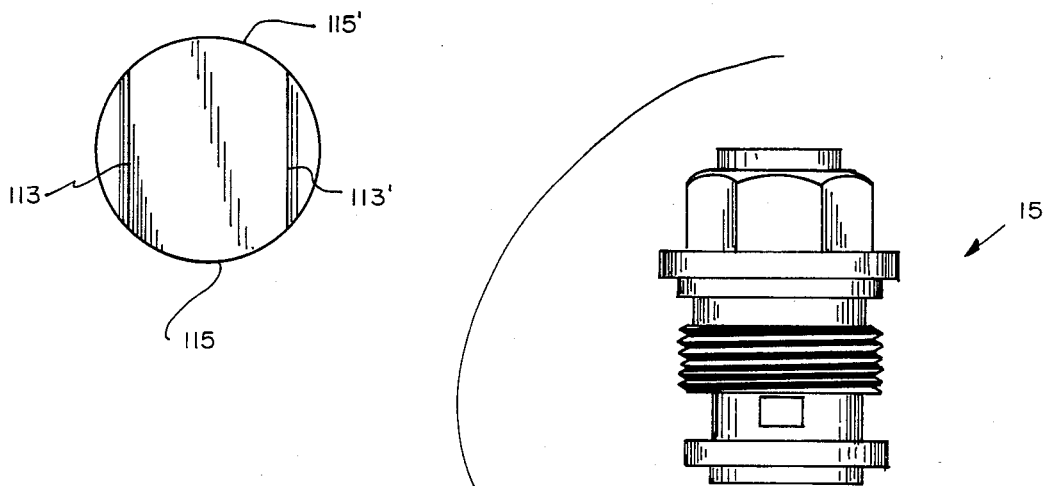
FIG. 16 is a bottom view thereof.
Figure 17:
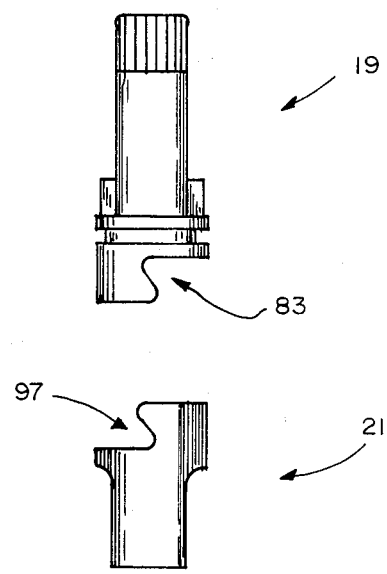
FIG. 17 is an exploded view of the cartridge of the present invention.

A pair of blocking means 115, 115' are disposed in interrupted portions of a cylinder on opposite sides of seal 21, 180° from one another and symmetrical with respect to faces 113, 113' as best seen in FIG. 16, In other words, blocking means 115, 115' are each parts of the cylinder which is interrupted by the undercut faces 113, 113'. Thus, the undercut faces 113, 113' are disposed inwardly of the imaginary cylindrical outline between blocking means 115, 115'. Stated another way, the blocking means 115, 115' face outwardly in diametrically opposed directions and are arranged 90° relative to the undercut faces 113, 113'.

Blocking means 115, 115' are in sealing engagement with the wall 63 of upper body 15 so that when blocking means 115 or 115' covers exit opening 61, the water flow in the spigot is cut off. On the other hand, when undercut face 113 or 113' is adjacent exit opening 61, the exit opening is not blocked which permits the flow of water through the valve to the spigot.

Figure 3:
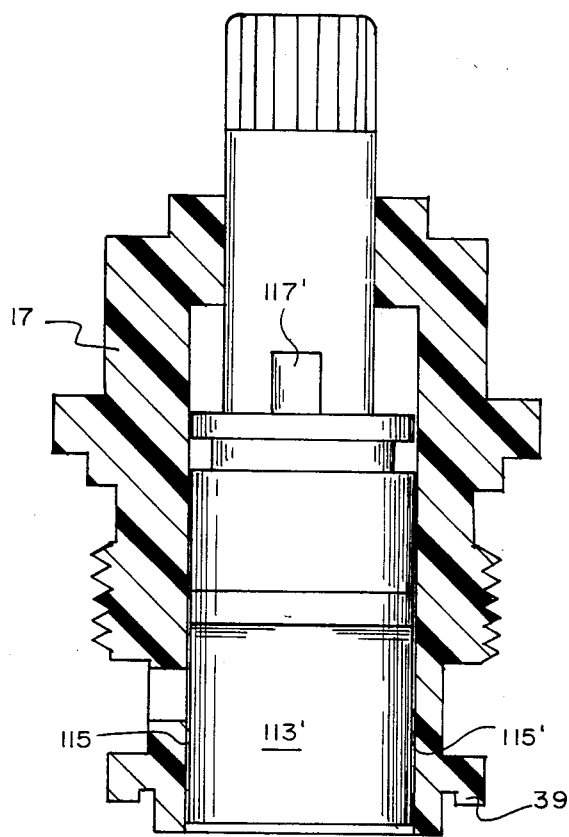
FIG. 3 is a view similar to FIG. 2 but showing the seal/stem combination in a closed position.
Figure 4:
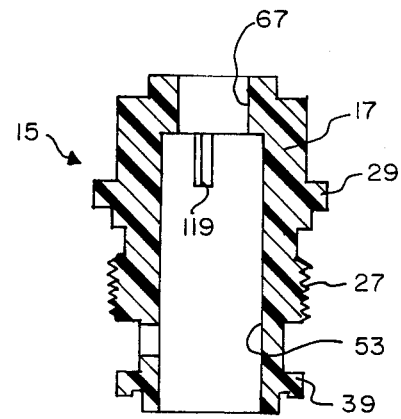
FIG. 4 is a sectional view of the upper body portion of the valve of the present invention taken as on the line II—II of FIG. 1 and with the seal/stem combination being removed therefrom.
Figure 5:
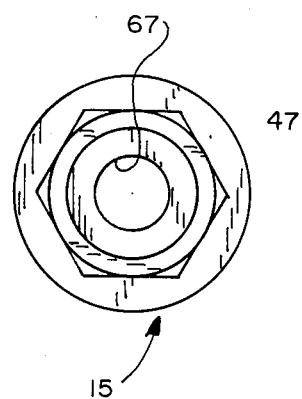
FIG. 5 is a top plan view of the upper body portion of the valve of the present invention.
Figure 6:
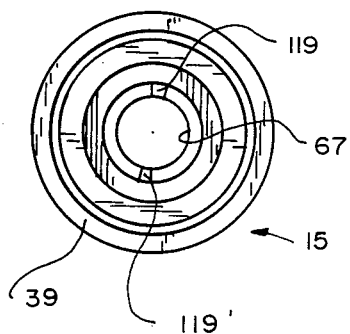
FIG. 6 is a bottom view thereof.

A pair of lugs 117, 117' are fixedly mounted integrally with and on opposite sides of stem 19. A pair of stops 119, 119' are fixedly attached integrally to upper body 15 in the upper part of bore 53. The stops 119, 119' are disposed in the path of lugs 117, 117' to stop turning movements of seal-stem assembly 109 in either a fully open position or fully closed position, that is, with face 113 being adjacent exit opening 61 as shown in FIG. 2 whereby the valve 11 is in a fully open position or stop the seal-stem assembly 109 in a fully closed position in which blocking means 115 is disposed in a blocking and sealing relationship to exit opening 61 as shown in FIG. 3.

In the normal operation of the valve 11, the handle 73 is turned to cause turning movement of seal-stem assembly 109 to move the seal-stem assembly 109 into a valve closed or a valve open condition, as heretofore described, or into positions therebetween. It will be understood that since there is only one exit opening 61 and due to the arrangement of the lugs 117, 117' and the stops 119, 119', only one of the blocking means 115 or 115' and only one of the undercut faces 113 or 113' operate in connection with the exit opening 61. However, when what particular blocking means 115 or 115' which is operating in connection with exit opening 61 becomes worn, as for example, assuming blocking means 115 is the one in operation with the exit opening 61, then the other blocking means 115' may be brought into operative relationship with the exit opening 61. This may be easily and quickly done as follows: Handle 73 is removed and cartridge 110 is unscrewed by means of a wrench being applied to hexagon nut portion 47 to remove cartridge 110 from lower body 17. The seal-stem assembly 109 is then withdrawn through the open lower end 57 of upper body 15. Seal-stem assembly 109 is then rotated 180° and replaced in upper body 15 which will then place the blocking means 115' and undercut face 113' in operating relationship relative to exit opening 61. Then cartridge 110 is replaced in lower body 17 and handle 73 is replaced on the stem 19. After the seal-stem assembly 109 has been turned 180° as above described and both of the blocking means 115, 115' have become worn then the seal 21 may be easily and quickly replaced with a new seal 21.

It will be understood that the valve 11 of the present invention provides an improved valve which has a unique seal means therein which when worn may easily be restored or replaced, as for example by the home owner. Thus, only a wrench is needed to remove the cartridge 110 and no tools are necessary to reverse or replace the seal 21 which simply and easily fits into place with the locking surface 83 of the stem 19.

A second embodiment of the present invention is shown in FIGS. 18–26. The upper portion of stem 2.19 is substantially similar to stem 19, including a toothed spline portion 2.69 and lugs 2.117 and 2.117'.

The lower end 2.79 of stem 2.19 is generally cylindrical on the outer surface 2.81 thereof to turnably fit cylindrical bore 53 of upper body 15. Lower end 2.79 is preferably provided with a groove 2.82 into which is adpated to fit a seal such as an O-ring, not shown. The lower locking surface 2.83 of the lower end 2.79 is bifucated to provide the depending portions 121, 121' and to provide a channel 123 therebetween. The inner faces 125, 125' of depending portions 121, 121' are preferably parallel with one another and with the longitudinal axis of the stem 2.19. Also, the faces 125, 125' are preferably so arranged that an imaginary line perpendicular to face 125 bisecting same and passing through the longitudinal center line of the stem 2.19 bisects and is perpendicular to face 125'.

Seal 2.21 is preferably integrally formed of a rubber-like material such as neoprene or the like. The upper end or coacting locking head 2.95 of seal 2.21 is complimentarily shaped as compared with the lower end 2.79 of stem 2.19 so that the coacting locking surface 2.97, 2.97' and 2.97" of seal 2.21 matingly engages the lower locking surface 125, 125' and 125" of stem 2.19, as best viewed in FIG. 26. The faces 125, 125' extend upwardly and outwardly away from each other at a slight angle, preferably each face is at a 1° angle relative to the vertical, and the surfaces 2.97, 2.97' are correspondingly angled, each preferably at a 1° angle relative to the vertical. Also, there is a close fit between surfaces 2.97, 2.97' and faces 125, 125'. When locking head 2.95 is placed in channel 123, it will have to be slightly forced therein since due to the above mentioned angle, the width of surface 2.97", as viewed in FIG. 23, will be slightly greater than the width of the lower end or mouth of channel 123, as viewed in FIG. 19. Thus, when locking head 2.95 is forced into place in channel 123, it will be locked in place against undesired separation while in operation, but may be removed for replacement.

The lower part or seal body 2.21' of seal 2.21 is undercut on opposite sides thereof as at 2.111 and 2.111'. Thus, as with seal-stem assembly 109, when seal-stem assembly 2.109 is in assembled relationship relative to upper body 15, the opposite flat faces 2.113 and 2.113' established by the undercut portions are spaced inwardly of the wall 63 of upper body 15. Undercut faces 2.113, 2.113' are disposed on opposite sides of the seal 2.21, 180° from one another, that is, they are facing in diametrically opposite directions.

A pair of blocking means 2.115, 2.115' are disposed in interrupted portions of a cylinder on opposite sides of seal 2.21, 180° from one another and symmetrical with respect to faces 2.113, 2.113' as best seen in FIG. 25. In other words, blocking means 2.115, 2.115' are each parts of the cylinder which is interrupted by the undercut faces 2.113, 2.113'. Thus, the undercut faces 2.113, 2.113' are disposed inwardly of the imaginary cylindrical outline between blocking means 2.115, 2.115'. Stated another way, the blocking means 2.115, 2.115' face outwardly in diametrically opposite directions and are arranged 90° relative to the undercut faces 2.113, 2.113'.

When the stem-seal combination 2.109 is assembled in upper body 15 (in the same manner as heretofore described relative to the assembly of stem-seal combination 109 into upper body 15) and the cartridge formed thereby is placed into lower body 17 (in the same manner as heretofore described for cartridge 110 assembled into lower body 17), blocking means 2.115, 2.115' are in sealing engagement with the wall 63. When blocking means 2.115 or 2.115' cover exit opening 61, the water flow in the spigot is cut off in the same manner previously described for the first embodiment. On the other hand, when undercut face 2.113 or 2.113' is adjacent exit opening 61, the exit opening is not blocked which permits the flow of water through the valve to the spigot.

The lugs 2.117, 2.117' coact with the stops 119, 119' in the same manner as heretofore described relative to the first embodiment.

Also, the operation of the stem-seal combination 2.19 when assembled with the rest of the valve as above described is substantially the same as the operation of valve 11 heretofore described. Thus, it will be understood that since there in only one exit opening 61 and due to the arranagements of the lugs 117, 117' and the stops 119, 119', only one of the blocking means 2.115 or 2.115' and only one of the undercut faces 2.113 or 2.113' operate in connection with the exit opening 61. However, when that particular blocking means 2.115 or 2.115' which is operating in connection with exit opening 61 becomes worn, then the other blocking means may be brought into operative relationship with the exit opening 61. This may be easily and quickly done by disassembling the parts as heretofore described relative to the first embodiment to remove the cartridge from lower body 17 and the seal-stem assembly 2.109 therefrom. Seal-stem assembly 2.109 is then rotated 180° and replaced in upper body 15 which will then place the other blocking means 2.115 or 2.115' and undercut face 2.113 or 2.113' in operating relationship relative to exit opening 61. After the seal-stem assembly 2.109 has been turned 180° as above described and both of the blocking means 2.115, 2.115' have become worn, then the seal 2.21 may be easily and quickly replaced with a new seal 2.21.

Although the invention has been described and illustrated with respect to preferred embodiments thereof, it is not to be so limited since changes and modifications can be made therein which are within the full intended scope of the invention.

I claim:

1. In an assembled water faucet, body means having a wall and a bore therein and having an exit port and an inlet port, stem means having a lower locking surface at the lower end thereof, a removable valve seal means matingly engaging said lower locking surface for coupling said seal means with said stem means for turning movement with said stem means, said stem means and said seal means being turnably mounted in said bore for conjoint movement in the operation of said water faucet between a closed position in which said seal means blocks said exit port and open position in which said exit port is uncovered by said seal means, said seal means including at least one undercut face spaced from said wall and extending through the lower end of said seal means with the space between said face and said wall being in direct communication at all times with said inlet port to allow water flow when said seal means is in said open position, said seal means including a locking head at the upper end thereof above said undercut face defining a coacting locking surface for coupling said seal means with said stem means and said seal means including blocking means in sealing engagement with said wall, and said body means, said stem means and said valve seal means being removable together so that said said valve seal means can easily be inspected for wear.

2. The faucet of claim 1 in which said stem means and said seal means are normally blocked from disengagement from each other by said body means.

3. The faucet of claim 2 in which said stem means is removable from said body means to unblock said seal means for the removal of said seal means from said stem means.

4. The faucet of claim 1 in which said locking surface defines a pair of spaced apart depending portions having a channel therebetween.

5. The faucet of claim 4 in which said channel is defined in part by faces extending upwardly and outwardly away from each other, and said coacting locking surface is defined in part by surfaces extending upwardly and outwardly from each other and closely fitting said faces.

6. In a water faucet, body means having a bore therein and having an exit port, stem means having a locking surface at the lower end thereof, a removable valve seal means matingly engaging said locking surface for coupling said seal means with said stem means for movement with said stem means, said stem means being turnably mounted in said bore for movement between a closed position in which said seal means blocks said exit port and open position in which said exit port is uncovered by said seal means, said locking surface defining an undercut stem portion and a protruding stem portion and said seal means including a coacting locking surface defining an undercut seal portion and a protruding seal portion, said protruding seal portion extending into said undercut stem portion and said protruding stem portion extending into said undercut seal portion to limit downward movement of said seal means relative to said stem means.

7. In a water faucet, body means having a bore therein and having an exit port, stem means having a locking surface at the lower end thereof, a removable valve seal means matingly engaging said locking surface for coupling said seal means with said stem means for movement with said stem means, said stem means being turnably mounted in said bore for movement between a closed position in which said seal means blocks said exit port and open position in which said exit port is uncovered by said seal means, said seal means including a coacting locking surface at its upper end, portions of said coacting locking surface extending into engagement with said locking surface of said stem means to limit upward and downward movement of said seal means relative to said stem means.

8. In a water faucet, body means having a wall and a bore therein and having an exit port, stem means having a locking surface at the lower end thereof, a removable valve seal means having a coacting locking surface at its upper end for matingly engaging said locking surface and for coupling said seal means with said stem means for movement with said stem means, said stem means being turnably mounted in said bore for movement between a closed position in which said seal means blocks said exit port and open position in which said exit port is uncovered by said seal means, said seal means including a pair of undercut faces positioned below said locking surfaces within said bore and spaced from said body means to allow water flow when one of said undercut faces is in adjacency to said exit opening and a pair of blocking means disposed between said undercut faces sealingly engaging said wall for blocking water flow when one of said blocking means is in adjacency to said exit opening.

9. In a water faucet, body means having a bore therein and having an exit port, stem means having a locking surface at the lower end thereof, a removable valve seal means having a coacting locking surface at its upper end for matingly engaging said locking surface and for coupling said seal means with said stem means for movement with said stem means, said stem means being turnably mounted in said bore for movement between a closed position in which said seal means blocks said exit port and open position in which said exit port is uncovered by said seal means, said seal means including a pair of undercut faces, said faces being disposed on opposite sides of said stem means 180° from one another, and said blocking means being disposed on opposite sides of said stem means 180° from one another and symmetrical with respect to said faces, whereby said stem means is placable in a selected one of two positions for the renewal thereof when one side is worn out after said body means, said stem means, and said seal means has been removed from the faucet as a single unit.

10. Seal means for a water faucet comprising a locking head means for coacting with a a locking surface at the lower end of a stem means in a bore of a faucet, a removable valve seal body means attached to said locking head means, said seal body means having a lower end remote from said locking head means, said seal body means including at least one blocking means blocking the flow of water in a faucet and at least one undercut face means extending through said lower end of said seal body means and positioned within said bore beneath said locking head means and said locking surface for permitting the flow of water in a faucet.

11. The seal means in claim 10 in which said coacting locking head means includes a coacting locking surface defining a pair of spaced apart faces.

12. The seal means of claim 11 in which said faces extend upwardly and outwardly away from each other.

13. Seal means for a water faucet comprising a locking head means for coacting with a locking surface at the lower end of a stem means in a bore of a faucet, a seal body means including a pair of blocking means disposed in interrupted portions of a cylinder and a pair of undercut face means between said blocking means and spaced inwardly of the imaginary cylindrical outline of said blocking means, said face means being disposed on opposite sides of said seal body means 180° from one another and said blocking means being disposed on opposite sides of said seal body means 180° from one another and symmetrical with respect to said undercut face means, said seal body means and said locking head means being integrally formed of a rubber-like sealing material, said seal body means having a lower end remote from said locking head means, and said undercut face means extending through said lower end of said seal body means and positioned within said bore beneath said locking head means and said locking surface for permitting the flow of water in the faucet.

14. Seal means for a water faucet comprising a locking head means for coacting with a stem means in a bore of a faucet, a seal body means including a pair of blocking means disposed in interrupted portions of a cylinder and a pair of undercut face means between said blocking means and spaced inwardly of the imaginery cylindrical outline of said blocking means, said face means being disposed on opposite sides of said seal body means 180° from one another and said blocking means being disposed on opposite sides of said seal body means 180° from one another and symmetrical with respect to said undercut face means, said seal body and said locking head means being integrally formed of a rubber-like sealing material, said locking head means including a locking surface defining an undercut seal portion and a protruding seal portion extending beyond said undercut seal portion for matingly engaging a locking surface at the lower end of said stem means within said bore.

* * * * *